April 8, 1952  F. A. RAY  2,592,331
TRAWL NET TOWING AND HAULING EQUIPMENT
Filed April 6, 1946  4 Sheets-Sheet 1
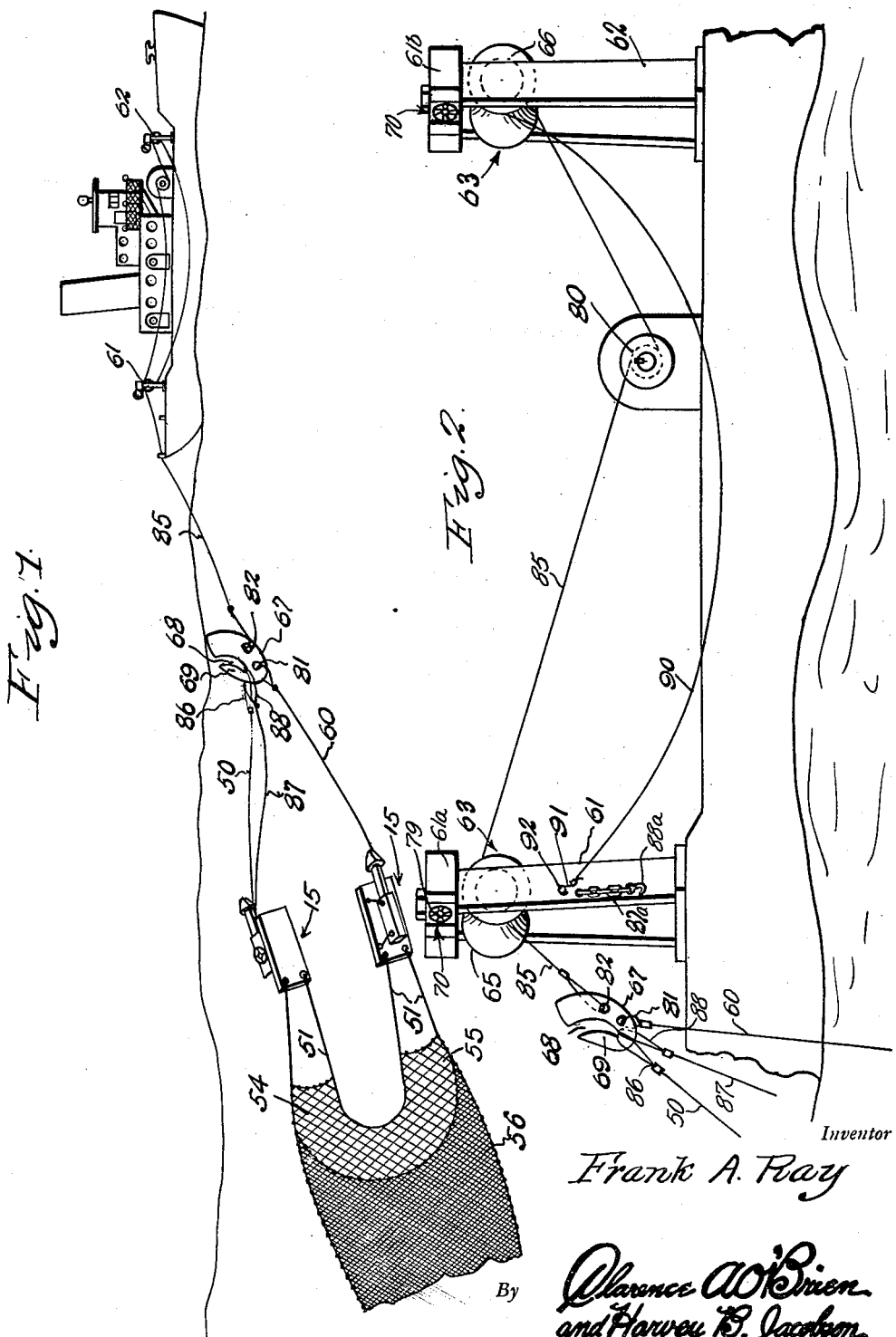

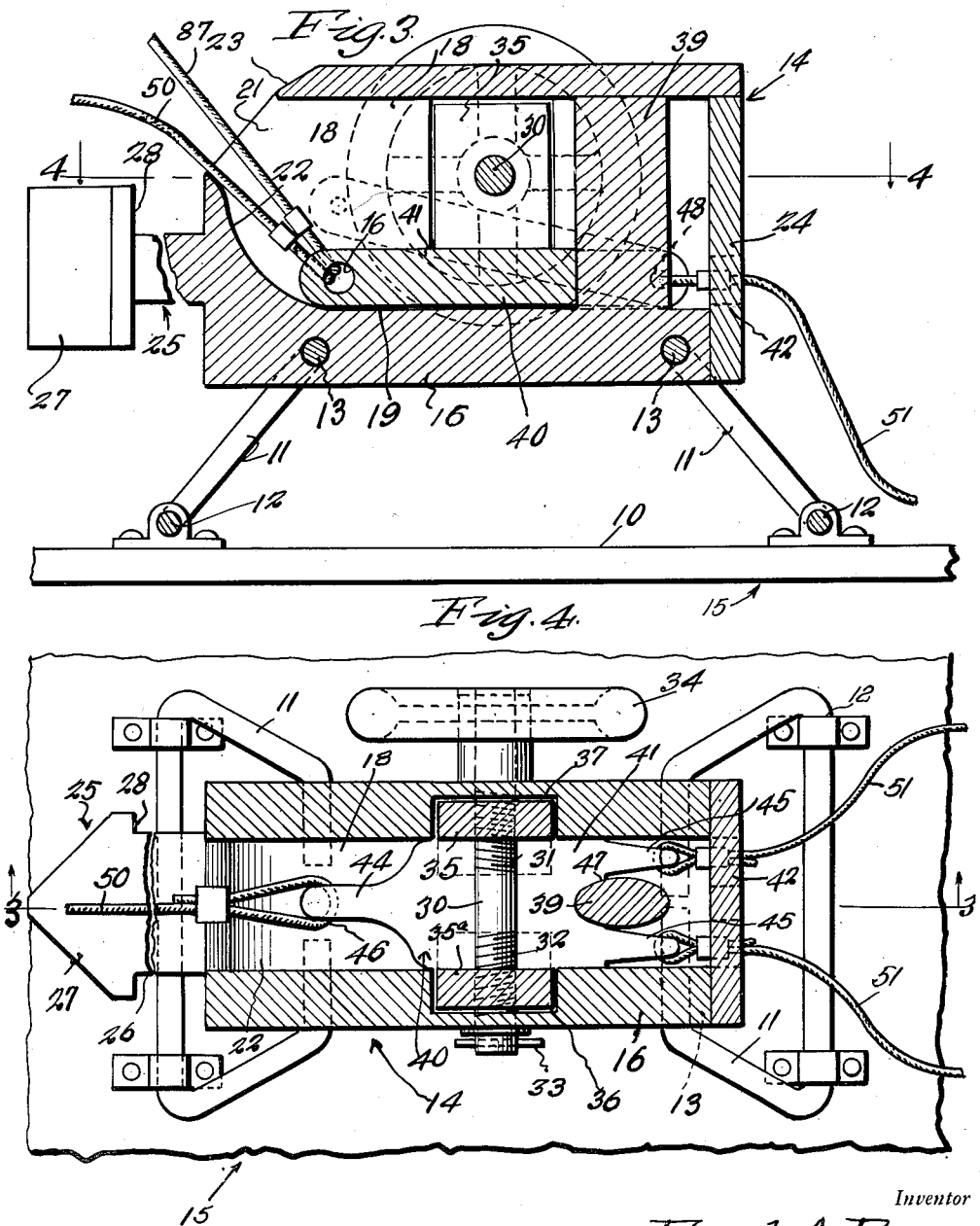

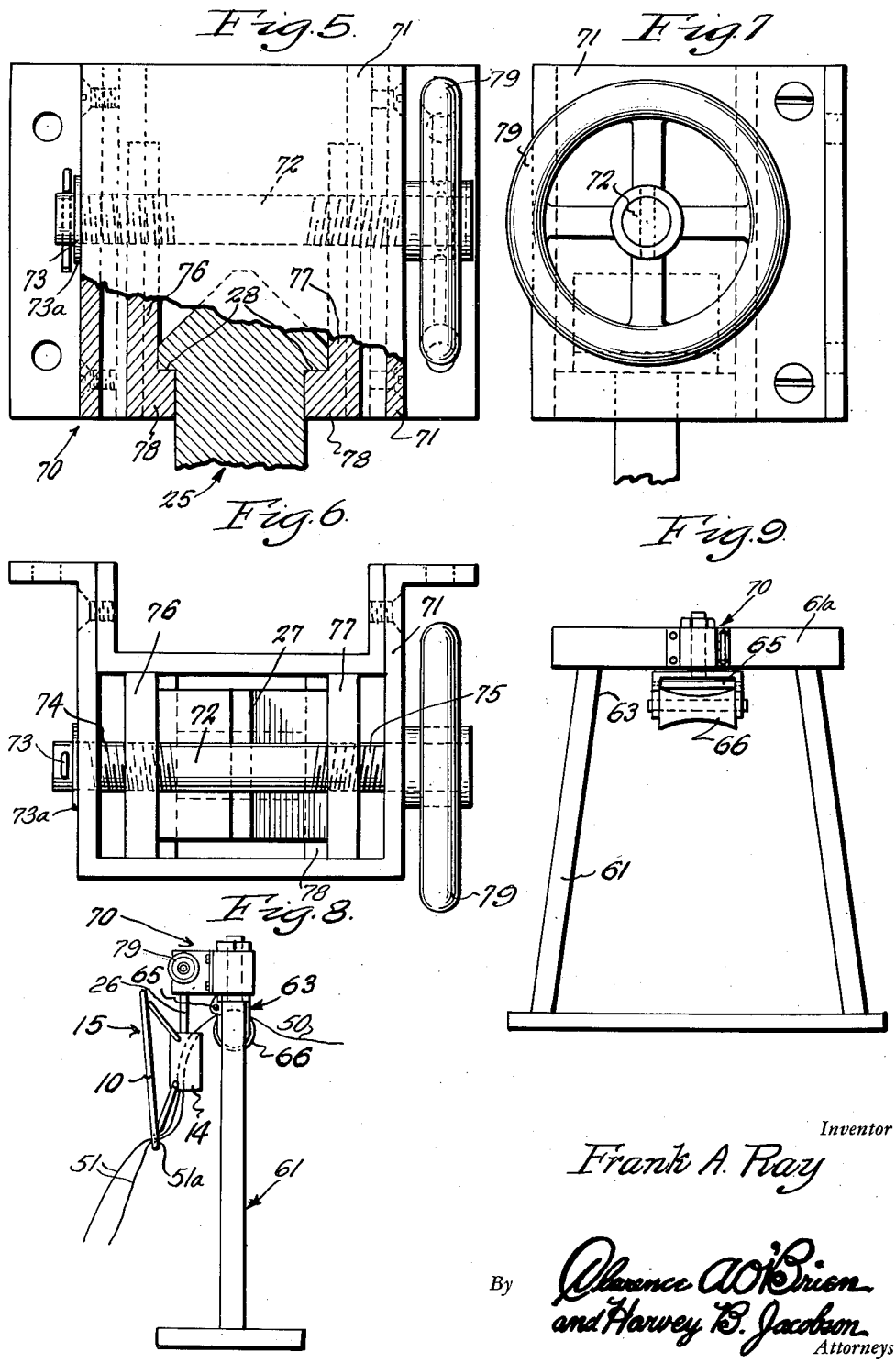

April 8, 1952 F. A. RAY 2,592,331
TRAWL NET TOWING AND HAULING EQUIPMENT
Filed April 6, 1946 4 Sheets-Sheet 4
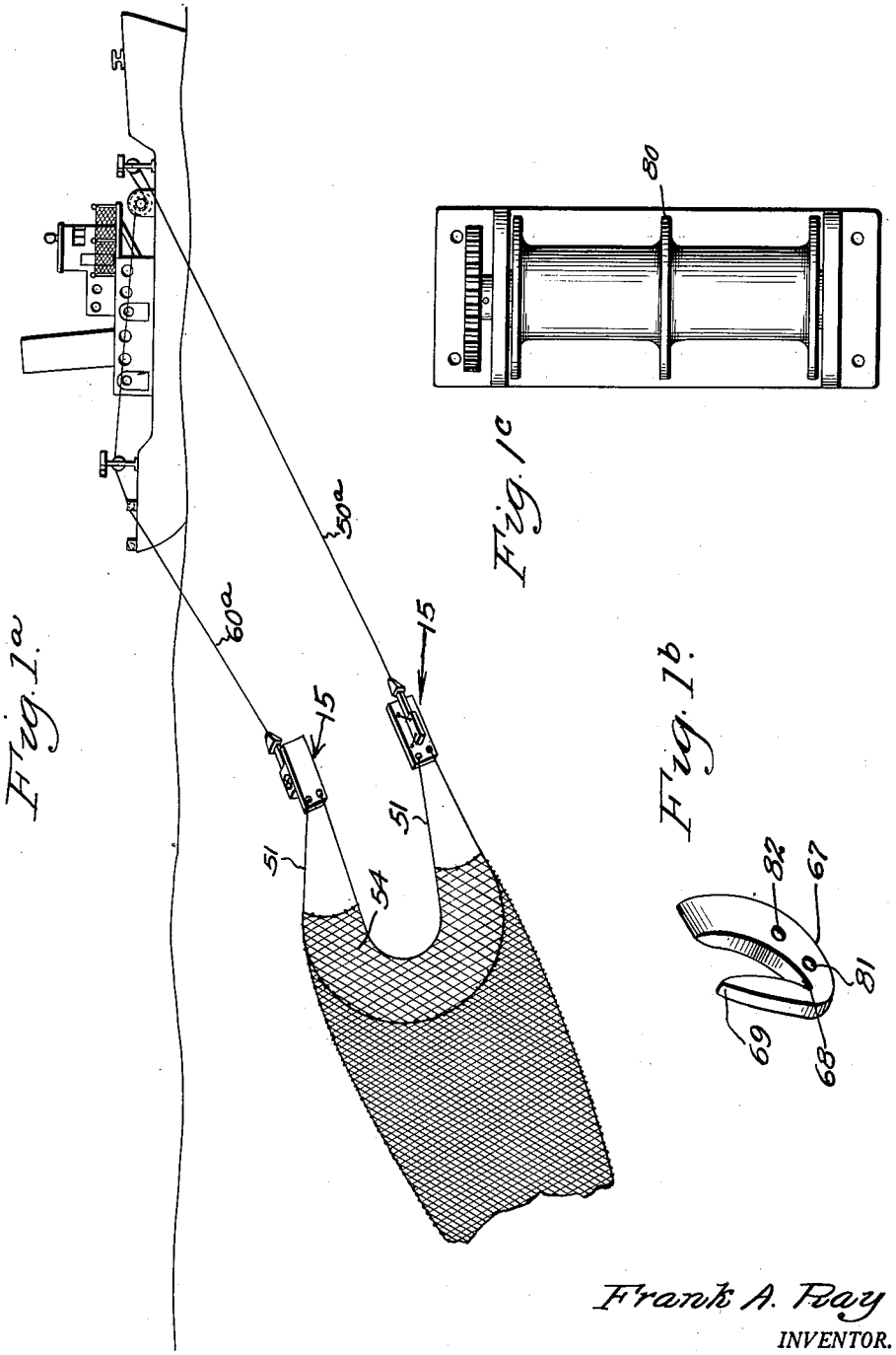

Patented Apr. 8, 1952

2,592,331

UNITED STATES PATENT OFFICE 2,592,331

TRAWL NET TOWING AND HAULING EQUIPMENT

Frank A. Ray, Fairhaven, Mass.

Application April 6, 1946, Serial No. 660,183

6 Claims. (Cl. 43—8)

My invention relates to trawl net fishing equipment and it has for its object to improve the equipment for holding open, towing and hauling in the net generally and to provide means whereby towing and hauling in of the trawl net may be rendered safer and may be performed with less exertion and difficulty, especially in bad weather, and whereby it is possible to eliminate or reduce the influence of the trawl net on the maneuverability of the boat when towed.

The invention, in order to realize these objects, comprises means for providing the trawl doors which are the customary means for keeping the trawl net open, with a device, adapted to be held and locked within said trawl doors, connected with the tow line wire leading from the trawl door to the boat on one hand and with a plurality of lines leading to the lateral wings of the trawl net on the other hand. The trawl net may, therefore, be arranged at any convenient distance from the trawl door whereby the maneuverability of the trawl net is improved. Moreover, a single wire or line, preferably the wire running to the aft gallows may be used for towing purposes whereby towing over the ship's stern is rendered possible, a method which greatly increases the ship's maneuverability.

In order to hold and lock the device abovementioned, a locking device is provided on the trawl door, which, in adidtion to the above mentioned locking function, also holds and locks the brackets of the trawl door and carries one part of a further locking device which cooperates with a stationary part mounted on the ship's gallows and which is adapted to lock said trawl door on the gallows when the trawl net is hauled in. This locking action greatly increases the safety of the crew and of the trawl net and reduces the exertion necessary to haul in the net, especially in stormy weather.

Further objects of the invention and other features of the same will be explained in detail in the following specification and with reference to the accompanying drawings which illustrate an embodiment thereof by way of example. These drawings illustrate one emobdiment of the invention only, but it is to be understood that this fact is not to be interpreted in a limitative sense.

In the accompanying drawings:

Figure 1 is a diagram illustrating the towing of a trawl net.

Figure 1ᵃ diagrammatically illustrates the towing of the net with two lines.

Figure 1ᵇ shows a perspective view of the trip link.

Figure 1ᶜ is a plan view of the winch used.

Figure 2 is a diagrammatical illustration of part of the broadside of a fishing boat showing the fore and aft gallows and the common winch for the wires of the net running over said gallows.

Figure 3 is an elevational sectional view of the trawl door locking device, the section being taken along line 3—3 in Figure 4.

Figure 4 is a sectional plan view of the device illustrated in Figure 3, the section being taken along line 4—4 of Figure 3.

Figure 5 is a partly sectional and elevational view of the device for locking the trawl door near the ballard on the gallows over which the towing wire runs.

Figure 6 is a plan view and Figure 7 is an elevational side view of the device illustrated in Figure 5.

Figure 8 is a side view of one of the gallows with ballard, and locking device in front of it and with the trawl door in position when locked.

Figure 9 is a front view of the gallows.

It may first be explained that in the customary towing operation two tow lines are used and the trawl doors are attached directly to the trawl net for keeping the trawl net open. The tow lines of the net are attached to them. The trawl doors consist of heavy boards, sometimes called wings, of wood or steel which are directly fastened to the lateral wings of the trawl net by means of U-shaped bails or coupling members arranged on the rear edge of the board. The board is, moreover, provided with so-called brackets of substantially triangular shape hinged on the fore part of the board to one of its faces. The two brackets are joined at their top by a shackle, usually formed by a simple ring, to which the towing cable is attached.

The tops of the two triangular brackets, when in towing position, are, therefore, lifted from the board and the point at which the towing line applies its pulling force is lifted above the surface of the board so that the latter is held in a position which is inclined with respect to the direction in which the net is towed, and under the pressure of the water will press the wings of the trawl net outwardly and keep the net open.

The trawl door, according to the present invention, is shown in Figures 3 and 4 and is generally indicated by 15. It consists of a board or wing 10, provided with the brackets 11, which are fixed to said board 10 by means of hinges 12. The brackets 11 are of trapezoidal form and carry the trawl door locking device which is designated in a general way by the reference character 14. It comprises a block 16 provided with bores 13 for receiving the ends of the brackets 11, whose central portion is hollowed out and forms a channel 18 which is substantially of rectangular cross section; its fore part 21, however, is narrowed, and the bottom 19 of the channel rises in a steep curve 22. The block 16 may be truncated or cut off along its upper edge as at 23, and the channel 18 may open into this cut off or truncated section, so that the channel orifice is turned upwardly. At the other or aft end of the block the block may be closed by a wall 24 provided with two openings 42.

The block carries on its fore part a locking projection 25, which comprises a stem 26 and a head 27 of triangular shape, projecting beyond the stem, thus providing locking surfaces 28 the purpose of which is explained below.

In its central part the block carries a locking shaft 30 into which threads 31, 32 are cut said threads running in opposite directions. The shaft 30 is held in the block by suitable means, such as a locker pin 33 or a nut. It also carries a hand wheel 34 for rotating it.

The screw-threaded portions 31, 32 of the shaft carry lock jaws 35, 35a provided with internal screw threads, fitting into recesses 36, 37 of the block. The lock jaws may be square, for instance, and the recesses in this case will be of similar shape in order to hold them against rotation. Rotation of the shaft 30 in one direction will, therefore, advance the jaws towards the center of block 16 while rotation in the other direction will move them towards the walls.

In the aft part of block 16 a cross beam 39 is arranged in the midst of the channel 18. It retains and holds a towing link and bridle wire log 40 which consists of a board 41 with a nose 44 and two ears 45. The nose and each ear is provided with an eye 46 and 48, respectively. The rear part of the bridle wire log 40 has a suitable recess 47 for accommodating the cross beam 39, so that it may rest firmly on said beam when drawn towards it. The cross beam 39, for instance, may be of elliptical cross section and the recess 47 is then shaped accordingly.

Through the eye 46 of the nose or front lug 44 of the bridle wire log 40, one of the tow lines 50 or 60 and a slacker wire mentioned below, is passed. Each line is fastened to the log in an appropriate manner. Likewise, in the eyes 48 of the ears two bridle wires 51 are fastened which pass through openings 51a and are connected with one of the wings 54 or 55, respectively, of the trawl net 56 (Figure 1).

It will be apparent from the above description that the trawl net 56 is fastened to the bridle wires 51 (Figure 1) connected with the bridle wire log 40 instead of being fastened directly to the trawl doors by bail couplings as usual. Said log is held against longitudinal movement by the cross beam 39 while it is held against transverse movement by the locker plates 35, 35a, when these plates are moved into proper position.

The net tow lines 50, 60 (Figure 1) run to a trip link 67 to which the single tow line 85 is fastened. This trip link 67 is an additional auxiliary member which is used when the net is towed by means of a single tow line over the stern of the boat, a method of operation which is made possible by the equipment according to the present invention.

This trip link (Figure 1b) consists of a flat block of approximately oval shape, provided with a curved slot 68 cutting into it from one side and thus producing a thumb-like projection 69. Moreover, the trip link is provided with two eyes 81, 82.

To the two eyes 81 and 82 the end of one of the tow lines 60 coming from one of the trawl doors and the end of the single tow line 85 with which the net is towed, is fixed.

A second tow line 50 from the other trawl door is provided at its end with a loop or eye 86 which is slipped over the thumb-like projection 69 and is held in the slot 68. When such a trip link is used, a slacker wire 87 fastened at one end to the bridle wire log 40 is preferably used while its other looped end 88 is also slipped over the thumb-like projection 69 and is held in the slot 68, the purpose of which will be apparent when the hauling operation is described.

When towing with one line 85 is practiced said line runs to the aft gallows 61. When towing with two lines 50a, 60a is practiced the said lines run to the aft gallows 61 and to the fore gallows 62, respectively. Each of the gallows consists of the usual standards and cross pieces 61a, 61b and carries a swivelly mounted frame with a hauling drum sometimes called a ballard 63 over which the tow line runs. The frame 63 in this case is provided with a small extra roller 65, arranged in front of and above the main drum 66 for a purpose to be described.

The frame 63, moreover, carries a trawl door locker, generally indicated at 70, on its front side. This device which is illustrated in Figures 5 and 6 comprises a casing or frame 71 through which a shaft 72 passes. The shaft is carried in a suitable manner and held by means of a washer 73a and locker pin 73 or by other appropriate means. Said shaft is provided with two threaded portions 74, 75, the threads of which run in opposite directions. Each of these threads carries a jaw 76, 77, respectively, provided with internal threads cooperating with threads 74, 75.

These jaws are rectangular plates, suitably held within the casing 71 so that they are secured against rotation. Their lower parts have projecting ledges 78 which are capable of gripping the projecting faces 28 of the locking member 25 of the trawl door mechanism. The shaft is provided with a hand wheel 79 for rotating the shaft 72. Such rotation, as will be easily understood, will advance the jaws 76, 77 towards each other so that they are able to grip the locking head 25 inserted between them; when moved away from each other the grip on said head is released.

For the hauling in of the net towed by one line 85, and wherein said line is provided with a trip link 67, the aft gallows 61 is provided with a chain 87a suspended at a suitable place and provided with a hook 88. Moreover a line 90 from the fore gallows 62 is suspended on a ring 92 projecting from aft gallows 61 by means of a hook 91 fastened to the end of the line 90. This line serves for hooking in the forward tow line 60 of the net 56 when the hauling of the latter has reached a phase in which the trip link 67 has come up to the gallows 61, a phase which is more fully explained below.

The equipment provided on the boat moreover comprises, as usual, a winch with a plurality of drums 80 aligned in Figure 2 which wind up the tow lines simultaneously.

Two modes of operation are possible with the equipment described. One mode of operation uses two tow lines and is, in many respects, alike to or practically identical with the operation now practiced. The two tow lines of the net, 60a and 50a (Fig. 1a), run to the fore and aft gallows 62, 61, respectively. When the net is hauled in, each trawl door comes up to one of the gallows and, when the equipment according to this invention is used, the trawl doors are held in the manner described below, the bridle wire log 40 is freed, and the net is hauled in.

The second mode of operation can only be practiced with the equipment as above described using trawl doors which are not directly attached to the net but are attached to the net only by means of the bridle wires 51.

The equipment, as above described, permits more efficient trawl net fishing. This is due to the fact that the trawl net, being no longer directly attached to the trawl door, but being attached by means of the bridle wires 51, spreads to the fullest possible extent; trawl nets with a larger spreading of wings may, therefore, be used which have a wider operative zone.

The use of only one tow wire is rendered possible according to the invention, by the introduction of the bridle wires between the net and the trawl doors.

The fact that towing with one wire is possible is a very marked improvement. The trawl net, when towed trails in the wake of the boat, but when the trawl net is hauled, the boat is broadside with respect to it. Therefore, in the known trawl net arrangements, such as in French Patent 657,321, the boat is provided with a block having a central opening, arranged aft of the gallows, but still on the broadside, through which the two tow lines are passed. This is necessary as the trawl net has to be towed with both lines equally tensioned or loaded in order to secure an approximately symmetrical position of the trawl doors on the net. The block has to be arranged alongside the ship's board as hauling is done broadside. However, this position of the block may be of great disadvantage during various maneuvers, as in this way a heavy load is applied to the ship's side under certain circumstances. If, for instance, the boat is running along the shore and trails the trawl net, but has to be turned, with a strong tidal or other current acting on the trawl net, then the force caused by the heavily loaded tow wires on the ship's side is very large and has a marked tendency to turn the boat around. This force may be as large as or larger than the forces which may be produced by the rudder and, therefore, the boat will cease to be responsive to said rudder. The same situation will occur when the boat has to turn against a tidal or other current which means against a resistance while the trawl net is in such a position as to oppose such a turn. The rudder may not be able to overcome the combined resistances due to current and to the trawl net and the maneuverability of the boat is, therefore, seriously impaired as long as this situation lasts.

Where towing with one wire takes place, the towing block which now guides a single tow wire need not be secured to the ship's side. It can be secured directly on the stern in the ship's longitudinal axis and the trawl net is therefore without influence on the ship's maneuverability. No situation will, therefore, occur in which the boat fails to respond to the rudder.

In order to permit the insertion of bridle wires between the trawl net and the trawl door the locking devices on the trawl door and on the gallows are provided which operate in the following manner.

The bridle wire log forms the connecting link between the tow wires 50 or 60 and the bridle wires 51. It is held by and locked in the trawl door by means of the lock jaws 35, 35a. It will be clear that when the bridle wire log 40 is placed in such a manner that its recess 47 rests on the cross beam 39 while it rests on the bottom 19 of the channel 18 and when the lock jaws 35, 35a are moved towards each other so that they will be within the channel 18, the bridle wire log will be locked in its position, as it is held within the channel 18 and is prevented from moving therein in a longitudinal and in a transverse direction. Movement in the latter direction is prevented by the bottom 19 of the channel and the lock jaws 35, 35a. Movement in the longitudinal direction is prevented by the cross beam 39 on one hand and the curved portion 22 of the channel 18 on the other hand which allows movement along it merely when the log is free to move transversely.

Such movement is rendered possible when the square jaws 35, 35a are retracted within the recesses. In this case the bridle wire log 40 may be pulled out through the part 21 without difficulty.

Referring now to the manipulation of the trawl net with tow lines, when the latter is to be hauled, the first operation comprises turning the boat so that it is broadside with respect to the net. The conventional winches such as illustrated in Fig. 1c are then operated to wind up both wires 50a, 60a simultaneously. This operation is continued until the trawl doors are coming up. As the trawl doors are very heavy it is difficult to manipulate them when outside the water when the known equipment is used.

With the present equipment, however, no difficult manipulation is required. It will be noted that the situation is different from that encountered in the usual arrangement insofar as the hauling of the trawl doors does not bring the net alongside the ship's board. In order to haul the net it is necessary to release the bridle wire log from the trawl door and to haul in the bridle wires. To accomplish this each trawl door when hauled and when it has arrived in front of the frame 63 of the gallows, will be stopped in front of the locker device 70. The locking projection 25 is in this case placed in such a position that it will enter into the space between the locker jaws 76 and 77 of the device and the hand wheel 79 will then be manipulated until the ledges 78 of the locker jaws 76, 77 have seized the undercut surfaces 28 of the triangular head on the locking device 25 of the trawl door.

The trawl door will then occupy the position as shown in Figure 8.

It will be clear that this locking operation may be accomplished easily even in very bad weather, as the hauling operation brings the trawl door to the front of the locking device 70.

When the trawl door has been locked in the manner described the hand wheel 34 is operated so as to retract the jaws 35, 35a. The bridle wire log 40 is thus freed and may be pulled out of the trawl door, when hauling by means of the winch 80 continues. This log 40 is guided between the main roller 66 and the auxiliary roller 65 of the ballard 63 and the bridle wires 51 may, therefore, be hauled in until the net comes into the desired position.

To haul in the trawl net 56 which has been towed over the stern of the boat by means of one tow line 85 attached to a trip link 67 the operation at the start proceeds as usual by means of winch 80, merely the aft gallows being, however, used, while the forward gallows remain idle.

When the tow line 85 has been hauled in and the trip link 67 comes up to the aft gallows (approximately into the position shown in Figure 2) the winch 80 is stopped. The line 50 and eye 86 which was hooked around the thumb-like projection 69 of the trip link is taken off the trip link and simultaneously the line 90 which was at rest on link 92 is taken off its rest and its hook 91 is hooked to eye 86 of the tow line 50. Therefore, one tow line 85 attached to the trip link 67, and the tow line 60 also attached to the trip link now run over the aft gallows, and the other tow line, 50 which is now attached to the line 90 runs to the fore gallows. Therefore the position of the tow lines is now the same as if the net had been hauled with two tow lines, as one line runs over the aft gallows, and one line runs over the fore gallows.

Simultaneously with the above described operation, the fastening means 88 at the end of the slacker wire 87 is taken from the trip link on which it was hooked and is hooked into corresponding fasteners 88a at the end of the chain 87a mounted on the aft gallows 61.

When the winch 80 is now again operated the remainder of tow wire 85 is wound up, the trip link will come up against the rollers 65, 66 and will pass between them and roll over. The tow wires 50, 60 are now exactly in the same position in which they would have been if hauling had been performed with two wires (see Figure 1a).

After this operation has been performed, the remainder of the operation is performed with two wires, as usual and the forward trawl door will arrive at the forward gallows and the aft trawl door at the aft gallows with the net spread between the two gallows.

The further operation of hauling the net is identical with the operation already described.

From the above it will be seen that the improved equipment, as described, permits a marked improvement of the trawl net fishing method having many advantages over the methods as now in use. These improvements are not, however, tied to the constructive details. Many changes may be made in the special construction of the locking devices for the bridle wire log in the trawl door and in the trawl door itself, and in many other details without in the least departing from the leading idea of the invention.

I claim:

1. A trawl door for trawl net towing and hauling equipment, comprising a board, brackets hinged to said board, a block permanently joining said brackets, said block being provided with a channel, a tow line and bridle line log adapted to be housed within said channel, and means for locking said log within said channel in a transverse and in a longitudinal direction.

2. A trawl door for use in connection with trawl nets comprising, a board, brackets hinged to said board and projecting therefrom, a block held by and permanently joining said brackets and provided with a hollow interior forming a channel curved at its entrance end, lock jaws adapted to be moved into said channel, a cross bar within said channel, and a tow line and bridle line link, housed within said channel, between said lock jaws and adapted to be locked within the same when the lock jaws are moved into the channel in a transverse direction and to be locked simultaneously by said cross bar against movement in a longitudinal direction.

3. A trawl door for use in connection with trawl nets comprising a board, brackets hinged to said board and projecting therefrom, a block joining said brackets and holding them in a position in which they project from said board, said block being provided with a hollow interior forming a channel with a restricted curved entrance portion, and being further provided with recesses on both sides of said channel, movable lock jaws arranged on said block at a distance above the bottom of the channel and adapted to enter into and to be housed within said recesses, said lock jaws being provided with bores having internal threads, means for moving said lock jaws into and out of the channel, said means including a shaft provided with threaded portions, the threads on the shafts engaging the internal threads on the lock jaws, a tow line and bridle line link forming a separate piece and provided with a nose on its front side and with a plurality of ears on its rear side for attaching the tow line and the bridle lines for a trawl net, respectively, said link being adapted to be housed within the channel, and a cross bar arranged in the rear part of said channel, said tow line and bridle line link being adapted to be locked between said cross bar and the curved channel entrance by the lock jaws when moved into the channel.

4. A trawl door for use in connection with trawl nets to be towed by a boat comprising, a board, brackets hinged to said board and projecting therefrom, a block held by and joining said brackets and adapted to hold the same in a position in which they project from the board, a locker head projecting from the fore part of said block and means for attaching a tow line to said block and for connecting said trawl door with a trawl net, said means including a plurality of bridle lines.

5. A trawl net towing and hauling equipment comprising at least two trawl doors, a towing line leading from each trawl door, gallows each carrying a drum for hauling the towing lines, means for connecting a trawl net with each trawl door said means including a plurality of bridle lines, means for attaching said tow lines and bridle lines to the trawl door including a block and an independently movable link adapted to be locked within said block, said block being moreover provided with a locking head projecting from its forward end, and a locking device adapted to lock said trawl door locking head, arranged on the gallows in front of said hauling drum.

6. A trawl net towing and locking equipment as claimed in claim 5 wherein the locking device on the gallows comprises a casing, movable jaws sliding within said casing and provided with internally threaded bores and with projecting ledges, a shaft provided with threads running in opposite directions engaging the said internal threads on the jaws and adapted to move the jaws towards each other or away from each other when rotated, said jaws being adapted to lock the locking head of the trawl door block when the latter has been inserted between the jaws.

FRANK A. RAY.

REFERENCES CITED

The following references are of record in the file of this patent:

FOREIGN PATENTS

| Number | Country | Date |
|---|---|---|
| 243,913 | Great Britain | Dec. 10, 1925 |